2 Sheets—Sheet 1.

L. SOLOMON.

AMALGAMATOR.

No. 675. Reissued Mar. 15, 1859.

Witnesses:

Isaac Jacobs
W. Joseph

Inventor:

Lewis Solomon

THE NORRIS PETERS CO., PHOTO-LITHO., WASHINGTON, D. C.

L. SOLOMON.

AMALGAMATOR.

No. 675. Reissued Mar. 15, 1859.

Witnesses:

Isaac Jacobs

E. W. Joseph

Inventor:

Louis Solomon

THE NORRIS PETERS CO., PHOTO-LITHO., WASHINGTON, D. C.

UNITED STATES PATENT OFFICE.

LEWIS SOLOMON, OF NEW YORK, N. Y.

IMPROVED AMALGAMATOR.

Specification forming part of Letters Patent No. 22,245, dated December 7, 1858; Reissue No. 675, dated March 15, 1859.

*To all whom it may concern:*

Be it known that I, LEWIS SOLOMON, of the city of New York, in the county and State of New York, have invented a new and useful machine for working auriferous and argentiferous ores, sweeps, &c., called an "Amalgamator;" and I do hereby declare that the following is a full, clear, and exact description thereof, reference being had to the accompanying drawings, through letters of reference marked thereon, forming part of this specification, in which—

Figure 1:
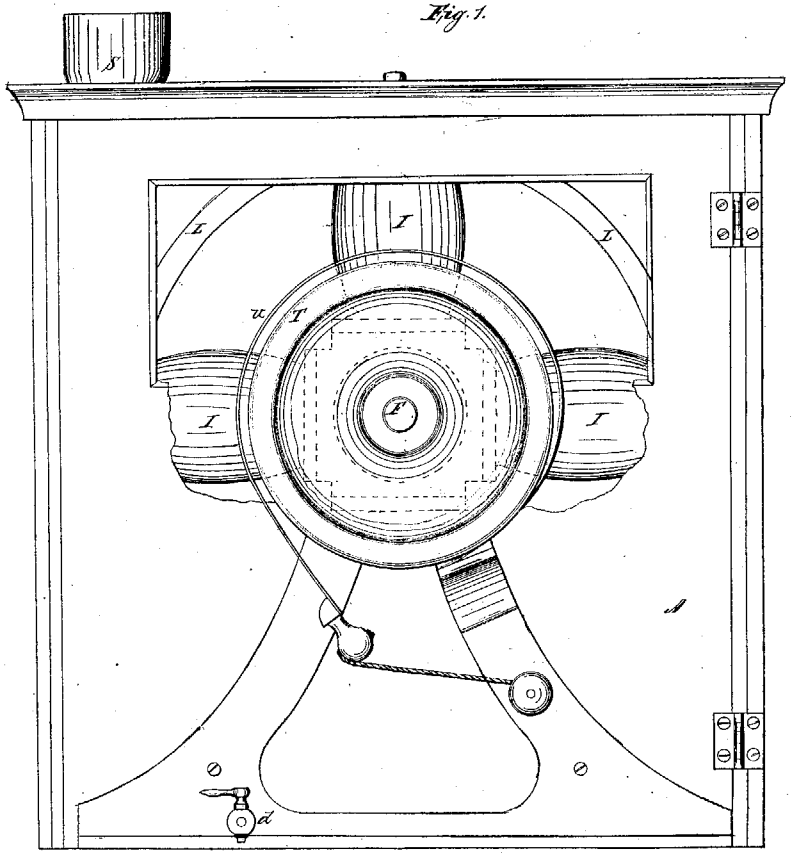
Figure 2:
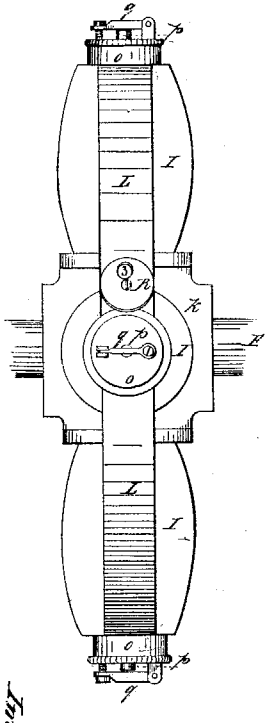
Figure 4:
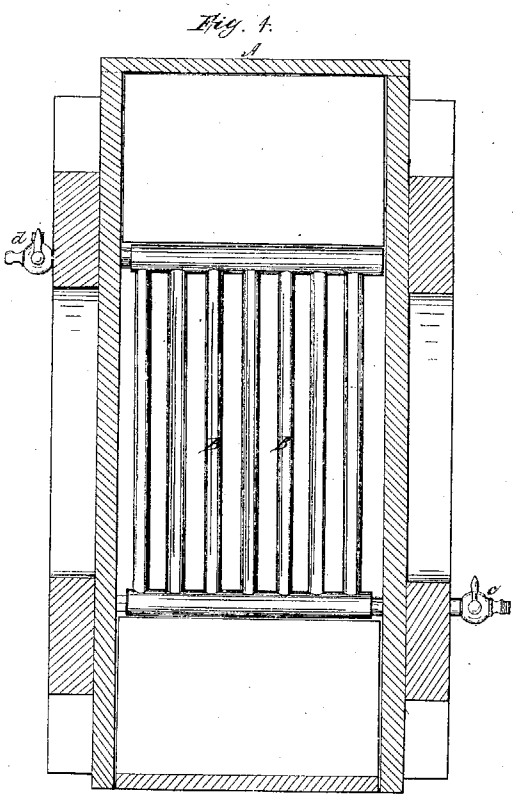
Figure 3:
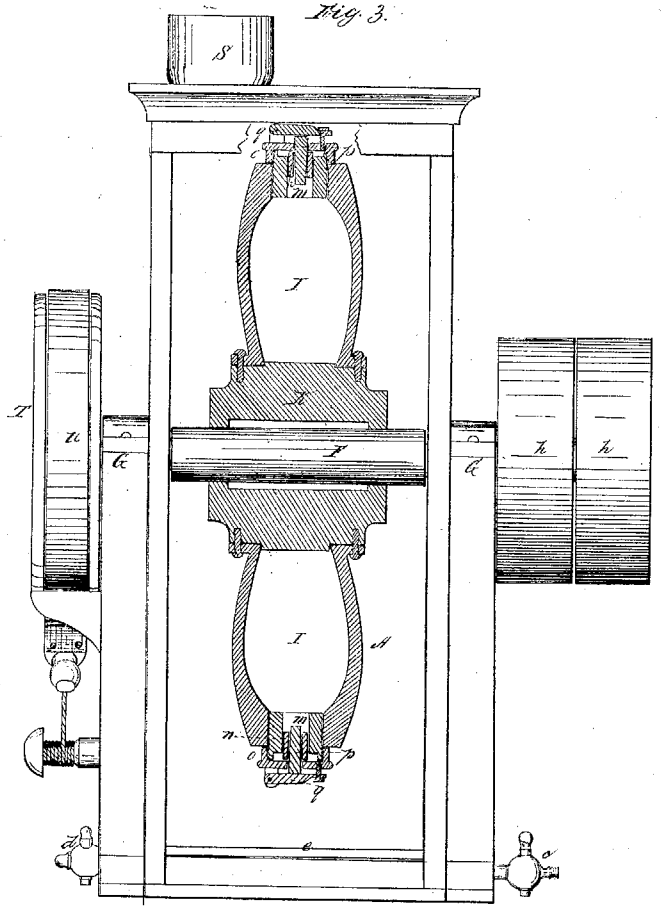

Figure 1 represents a side elevation of my machine arranged in a heated apartment or closet, a portion of one side of the closet being broken away to show the machine more clearly. Fig. 2 is an edge view of the machine removed from the closet; Fig. 3, an end elevation of the closet open, showing a vertical transverse section of the machine, taken through the center; and Fig. 4, a horizontal section of the same, taken on the line *x x* of Fig. 3, showing the steam-pipes for heating said closet uncovered.

The same letters of reference occurring in the several figures indicate corresponding parts.

The common principle of action in all amalgamators heretofore invented is that of a cylinder revolving on its axis, the objection to which is that the mercury used for amalgamation flows along the lower side of the cylinder almost, if not altogether, in advance of the ore, never being separated into globules or searching the ore by filtering through it, the powdered ore rolling over on the top or surface of the mercury, which therefore only takes up such metallic particles as may happen to come in contact with it.

My invention consists in constructing a machine in such form and manner as to remedy this difficulty and insure a more thorough searching of the ore, sweeps, &c., by the mercury, for the precious metals contained, and in other minor points, which will be fully set forth in this specification.

To enable others to make and use my invention, I will proceed to describe its construction and operation.

A represents the apartment or closet in which the apparatus is erected, in the bottom of which is arranged a series of pipes, B, into which steam is admitted to heat the apartment during the operation. The steam enters through the cock *c*. The water which forms by condensation in the pipes passes off at the cock *d*. A cover, *e*, is made to fit closely over the series of pipes, to prevent the accumulation of dirt between them while charging and discharging the amalgamator with ore, &c. Transversely through the center of this closet is a shaft or axle, F, supported and rotating in bearings G, suitably constructed and arranged for that purpose. On one end of this shaft, outside the heated chamber, is hung a fast and loose pulley, *h h'*, or other suitable mechanical device for rotating the same, and on the other end is a friction-pulley, T, and band, *u*, for holding it in any desired position for charging or discharging. Within the closet, and on this shaft, is supported the amalgamator, which consists of a series of cylindrical, conical, oval-shaped, or other elongated chambers, I, attached endwise and radially to a hub, *k*, keyed on the shaft F, and are braced to each other at their outer extremities by stays L. Each of these chambers I is provided with a collar, *m*, screwed into or otherwise firmly attached to its outer end, through which is an opening sufficiently large to put in the ground ore. A plug or bung, *n*, is fitted into this opening and held in its place by a cap, *o*, secured to the collar. Through the center of this cap and bung is a smaller hole for pouring in and discharging the mercury, and is stopped by the plug *p*, which in turn is secured by a bar, *q*, across its end, and about twelve shots (more or less) of six pounds weight each are placed in each chamber.

In working this machine there are several distinct operations to be performed. Therefore, in order to prevent any mistake in the charging or discharging of the several chambers successively, a register, R, is affixed by each, by means of which each operation as it is performed is indicated.

For working gold the chambers may be made of iron; but for silver they should be made of wood or other material that will not be affected by the chloride of silver.

In describing the operation of this machine it will not be necessary to mention quantities or proportions of the different ingredients, as that is fully specified in my improved process of working auriferous and argentiferous pyrites, and I shall therefore simply describe the routine of operation. The ore is first crushed and passed through a sieve of about twenty-eight meshes to the inch, and then mixed and thoroughly incorporated with chloride of sodium, and afterward roasted in a furnace, care being taken not to raise the temperature above a dull-red heat during the first three or four hours, after which, however, it may be raised at intervals to a higher degree till that operation is completed. The ore is then ground with wood-ashes and bolted fine, and each chamber of the amalgamator charged with a proper quantity of this mixture, to which is added a sufficient quantity of water (by weight) to reduce the mass to a pasty consistency that will cause the mercury to separate into globules and filter through, instead of passing through in a body. A proportion of soda-ash is also added, and about fifty pounds of bar-iron, in pieces of about one inch square by three inches long, to the contents of each chamber. The chambers are then closed and put in motion at the rate of eight or ten revolutions per minute for about one and a half or two hours, or until the several ingredients are thoroughly incorporated. The machine is then stopped and the chambers brought successively into a vertical position, plug upward, which may then be drawn, and about two hundred pounds of mercury poured into each chamber and again closed and revolved, as before, for about sixteen hours. During the whole of this time the apartment in which the amalgamator is inclosed should be heated by the steam-pipes to 130° or 150° Fahrenheit. At the end of about sixteen hours a solution of sulphate of iron is added to the contents of each chamber, and rotated, as before, for about four hours longer, after which water, which has been previously heated in the reservoir S on or in the upper part of the heated apartment A, is added—say from fifty to one hundred pounds in each chamber—and the machine again rotated for about one hour longer to thin the mass so that the globules of mercury may collect in a body. The amalgamation being now completed, each chamber is brought successively into a vertical position, plug downward. The mercury, being the heaviest, will immediately collect at the bottom, when it may be tapped off into a receiver placed underneath for its reception by drawing the small plug *p*, which must be again inserted as soon as the earthy matter begins to discharge. The amalgam being thus drawn off from the various chambers, another receiver is placed under each successively, and the residuum drawn off through the larger opening in the collar *m*, and placed in suitable vessels for washing out the remaining mercury. The mercury is then pressed through chamois-leather or canvas bags for the collection of the amalgam and expulsion of free mercury, after which the amalgam may be distilled and the gold melted in crucibles and cast in the usual manner.

The various times above specified are not absolute, but may be varied as found necessary for the different qualities of ores by practical application.

This machine is equally well adapted to working free-gold ore, silver ore, or sweeps—as the sulphurets—in which case the chemical agents above referred to may be omitted.

Having thus described my invention, what I claim as new, and desire to secure by Letters Patent, is—

1. The use of elongated amalgamating-chambers I, when arranged to operate in the manner and for the purposes specified.

2. The arrangement of the amalgamating-chambers I within a heated chamber, A, for the purposes specified.

In testimony whereof I have hereunto subscribed my name before two subscribing witnesses.

LEWIS SOLOMON.

Witnesses:
DAN SEEXAS,
JOSEPH SOLOMON.